United States Patent [19]

Hutchison

[11] 4,453,570

[45] Jun. 12, 1984

[54] CONCENTRIC TUBING HAVING BONDED INSULATION WITHIN THE ANNULUS

[75] Inventor: Stanley O. Hutchison, Bakersfield, Calif.

[73] Assignee: Chevron Research Company, San Francisco,, Calif.

[21] Appl. No.: 278,800

[22] Filed: Jun. 29, 1981

[51] Int. Cl.³ .............................................. F16L 59/14
[52] U.S. Cl. ........................... 138/149; 138/DIG. 1; 138/DIG. 9
[58] Field of Search ............... 138/103, 140, 141, 143, 138/149, DIG. 1, DIG. 9; 166/77, 242

[56] References Cited

U.S. PATENT DOCUMENTS

| | | | |
|---|---|---|---|
| 1,387,348 | 8/1921 | Burgstresser | 138/149 X |
| 2,756,172 | 7/1956 | Kidd | 138/149 X |
| 2,857,931 | 10/1958 | Lawton | 138/149 X |
| 2,906,317 | 9/1959 | Keyes | 138/149 X |
| 3,000,433 | 9/1961 | Kemper | 138/149 X |
| 3,058,860 | 10/1962 | Rutter | 138/149 X |
| 4,287,245 | 9/1981 | Kikuchi | 138/149 X |

*Primary Examiner*—James E. Bryant, III
*Attorney, Agent, or Firm*—D. A. Newell; E. J. Keeling; L. S. Gruber

[57] ABSTRACT

An insulated concentric tubing well element having an inner tubing and an outer tubing with a substantially solid insulating material in the annulus between the inner and outer tubing. A bonding material fills the voids in the annulus and the surface of the solid insulating material. The bonding material prevents movement within the annulus and seals the annulus. Calcium silicate is disclosed as a suitable material for the solid insulation and sodium silicate is disclosed as the bonding material. A method is disclosed for producing the complete well element.

1 Claim, 4 Drawing Figures

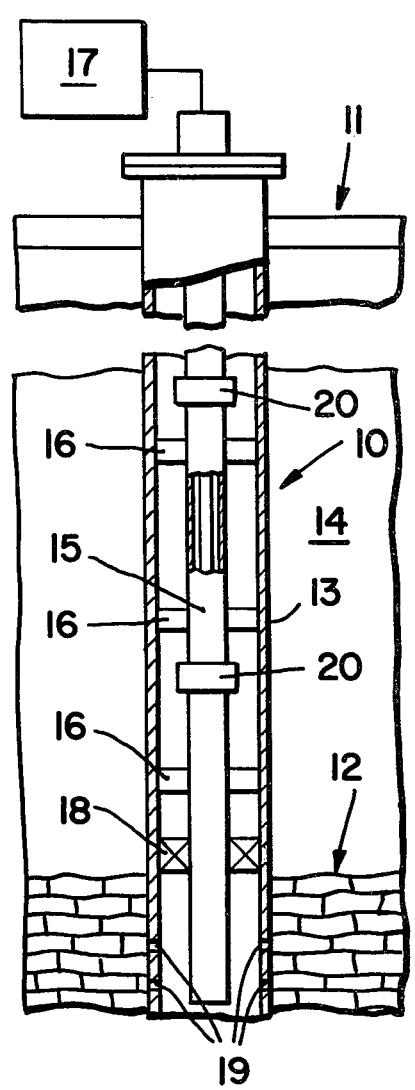
FIG_1
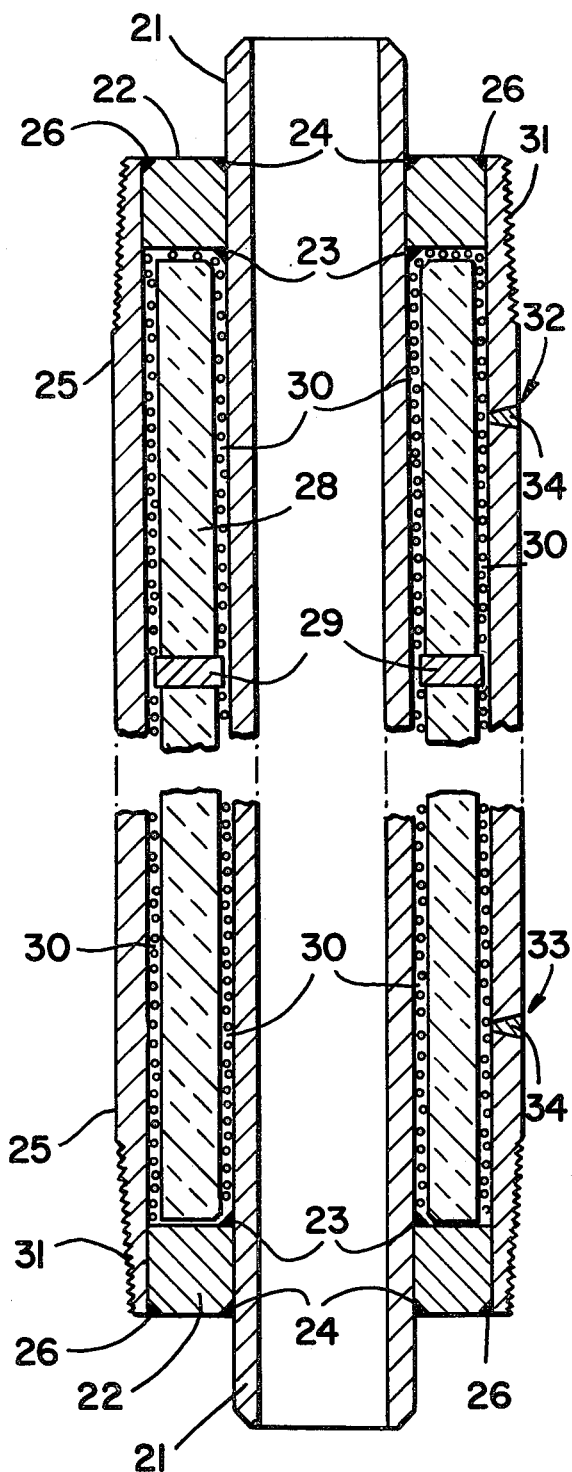
FIG_2

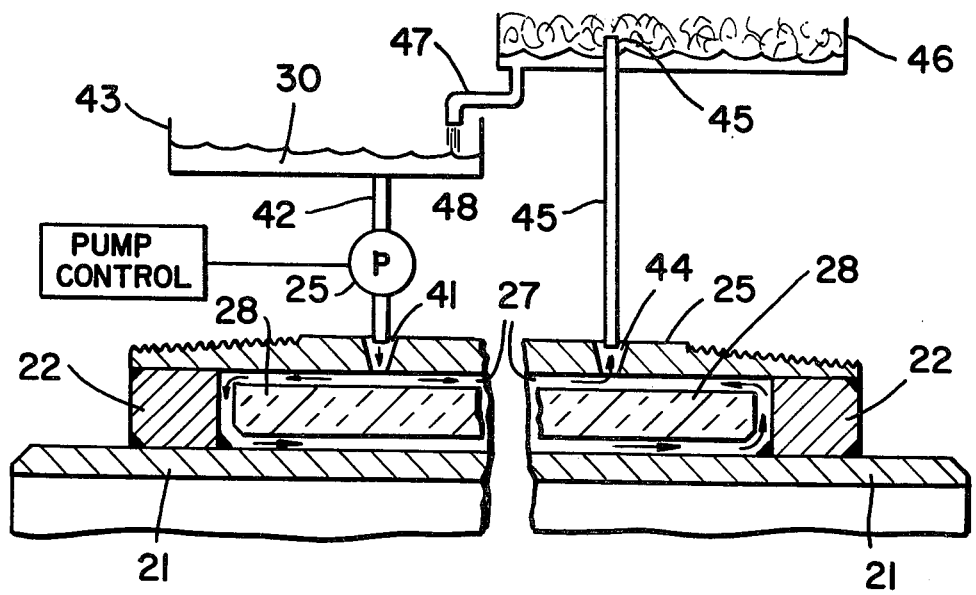
FIG_3
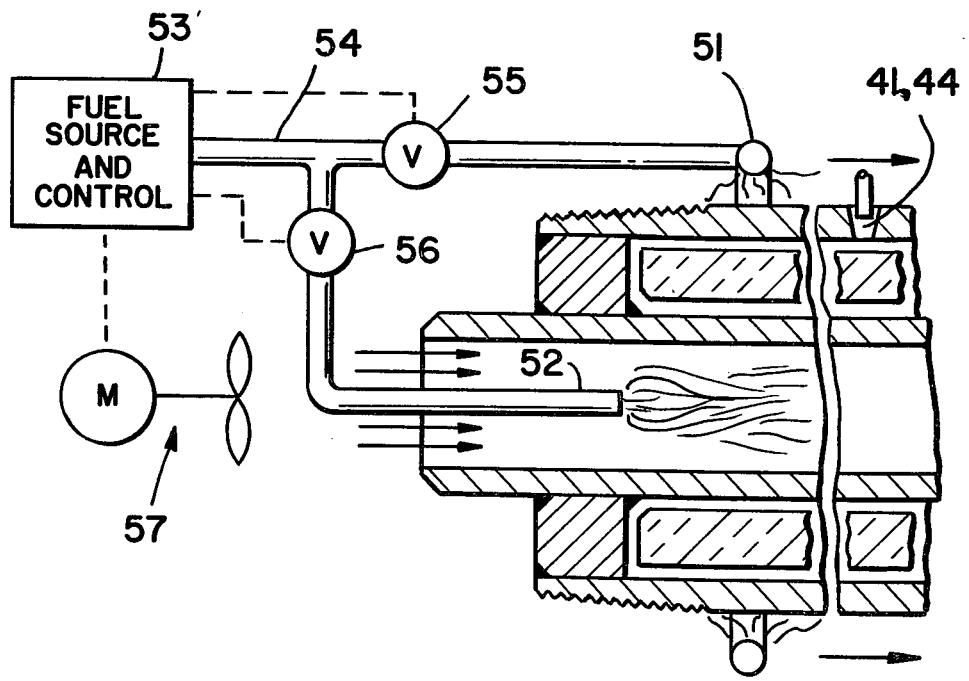
FIG_4

CONCENTRIC TUBING HAVING BONDED INSULATION WITHIN THE ANNULUS

BACKGROUND OF THE INVENTION

1. The Invention

This invention relates to insulated concentric tubing and more particularly to insulated concentric tubing as used in wells. The use of such tubing is usually intended to prevent the loss of heat between the interior of the inside conductor and the exterior of the outside conductor. The tubing has application in wells where hot produced fluids flow upward through the inner conductor and in wells where hot fluids are pumped downward through the inner conductor. In either case, there is a need to prevent the transfer of heat from the inner conductor through the tubing materials to the annulus around the outside of the outer conductor.

2. The Prior Art

In a copending application of Stanley O. Hutchison, Ser. No. 182,364, filed Aug. 29, 1980 for Insulated Concentric Tubing, there is disclosed an improved concentric insulated tubing string having an inner conductor, an insulating annulus surrounding the inner conductor, and an outer conductor. That application discloses a concentric conductor tubing string that has couplings between adjacent sections connected to the outer conductor and an improved coupling construction providing thermal insulation at the coupling.

Other prior art patents have suggested insulating schemes for accomplishing thermal insulation between the inner conductor and outer conductor of a concentric tubing string. See U.S. Pat. No. 3,525,399, Bayless, issued Aug. 25, 1970, U.S. Pat. No. 3,608,640, Willhite et al, issued Sept. 28, 1981, U.S. Pat. No. 3,680,631, Allen et al, issued Aug. 1, 1972 and U.S. Pat. No. 3,720,267, Allen et al, issued Mar. 13, 1973.

A common failure of many of the prior art insulation schemes has been the mechanical failure of the insulating material frequently because of the collapse of the insulating material within the annulus. The failure may be caused by rough handling during transport to an installation site or during actual installation in a well and, in some cases, by sealing failures during use when formation liquids seep into the insulation zone causing the insulation to become fluid saturated thus losing its isulation quality. These failures have demonstrated a need for an insulating material in the annulus of a concentric tubing string that can withstand the hostile handling associated with the well environment and a method for placing that insulation in the annulus that will substantially insure that seepage of formation fluids will not destroy the insulating quality of the insulation.

SUMMARY OF THE INVENTION

This invention is an improvement on the invention disclosed in the previously mentioned copending application of Stanley O. Hutchison, Ser. No. 182,364, filed Aug. 29, 1980 for Insulated Concentric Tubing. The disclosure of that application is incorporated herein by reference. The improvement in this invention is the treatment of the insulating material in the annulus between the inner and outer conductor and the method for treating that insulation.

In accordance with the present invention, the space within the annulus of the fabricated concentric tubing which is not filled with preformed insulating materials, is filled with a liquid bonding material so as to soak at least the surface the insulating material and the surfaces of the tubular materials defining the annulus. The liquid bonding material is then heated to dehydrate the liquid phase and leave remaining in the annulus a foamed residue of the bonding material, establishing a firm contact with the metal edges defining the annulus and the insulating material within the annulus. The annulus is thus completely sealed and the preformed insulating material is tightly bound to the surfaces of the annulus.

Preferred forms of insulating material and bonding material are herein disclosed and preferred methods for placing and processing the bonding material are described.

The object of the present invention is an improved insulated concentric tubing which may be handled in the same manner as conventional oil field tubular goods without concern for destruction of the insulating material between the tubings of the concentric tubing. Other objects and features of the present invention will be readily apparent to those skilled in the art from the appended drawings and specification illustrating a preferred embodiment wherein:

FIG. 1 is a representation of an installation of a concentric tubular string in a well bore penetrating an earth formation with part of the elements and the formation shown in section.

FIG. 2 is a cross-sectional view through one section of an insulated concentric tubing element of the present invention.

FIG. 3 is a partial sectional view of a section of an insulated concentric tubing of the present invention during fabrication.

FIG. 4 is a partial sectional view through a portion of an insulated concentric tubing string of the present invention illustrating apparatus useful in producing the insulated concentric tubing section of the present invention.

DESCRIPTION OF THE INVENTION

FIG. 1 is a sectional view through an earth formation illustraing the present invention in its installed position within a cased well. As illustrated, a well 10 is drilled from the earth's surface 11 to an oil-bearing formation 12. A typical oil-bearing reservoir to which the present invention has application includes a formation containing viscous crude oil which cannot be produced to the earth's surface under formation pressure and temperature. A technique for stimulating the production of a viscous crude oil from such a subsurface oil reservoir is to inject steam into that reservoir through a steam injection well to heat the oil and reduce its viscosity. As herein illustrated, the injection well includes a metal casing 13 passing through the formation 14 to the subsurface horizon of the formation 12. A steam injection conduit 15 is positioned inside the casing 13 and spaced by suitable spacing means 16 to conduct steam from a surface steam generating source 17 to the subsurface formation 12. Individual sections of the concentric tubing are joined by couplings 20 to produce the overall injection string. A packer 18 is usually provided at the downhole end of the steam conduit 15 to prevent steam from flowing back up the annulus between the conduit and the casing. The casing is perforated, as at 19, at the location of the oil-bearing formation to provide conduits into and out of the permeable oil-bearing formation.

FIG. 2 illustrates, in sectional form, the construction of a concentric tubing steam injection conduit as illustrated generally in FIG. 1. It should be understood that FIG. 2 illustrates only one section of the string illustrated in FIG. 1 and that the threaded portions at each end of the section are adapted to cooperate with a threaded coupling 20, as shown in FIG. 1, to form a continuous string from the surface to the subsurface formation. Each of the individual concentric tubing conduit sections is made up of an inner tubing 21 having an annular member 22 secured at each end to the exterior surface of the inner tubing, as by being welded thereto at 23 and 24. The outer surface of the annular member 22 is secured to the inner surface adjacent to each end of the outer tubing section 25. The connection between the annular members 22 at each end and the outer tubing 25 is established by welding the end of the annular member, as at 26, to the end of the outer tubing section.

The annular space 27 between the outside of the inner tubing 21 and the inside of the outer tubing 25 is filled with an insulating material 28 of a substantially solid insulating material almost, but not completely, filling the annular space, in a radial sense between the inner and outer tubing. The insulating material 28 may be formed of tubular sections which are inserted over the outside of the inner tubing when the inner tubing is inserted into the outer tubing. The tubular sections of the insulated material may be split longitudinally to fit around the inner tubing during assembly.

Between sections of the insulating material 28 a ring-like spacer 29 is provided to maintain positioning of the insulating material and to assist in the prevention of the collapse of the outer tubing onto the insulation and the inner tubing.

The small space between the inner and outer tubing and the insulating material within the annulus is filled with a bonding and insulating material 30 so as to completely fill any void in the annular space and to provide a bond between the insulating material 28 and the annular area surfaces of the inner and outer tubing.

The tubular section is completed with conventional oil field pipe threads at 31 at each end of the tubing section. Ports at 32 and 33 are filled with welding material 34 and machined flush with the outer surface of the tubular section to complete the section.

In its final form, the tubing section, as illustrated in FIG. 2, comprises an inner tubing portion insulated from an outer tubing portion with the annulus between the two tubing portions filled with insulating material. The ends of the tubing section are sealed by annular rings and a portion of the inner tubing extends beyond the end of the outer tubing at each end to permit the tubing section to be joined with similar tubing sections by a coupling member to produce the desired tubing string.

In the previously identified copending application, Ser. No. 182,364, a method has been described for fabricating the tubing section in a manner to overcome the eventual stresses which might be placed on the tubing section during its use in an injection or production well when the inner tubing is at a different temperature than the outer tubing. As described in that application, the inner tubing is placed with its insulation inside the outer tubing and it is heated to cause it to expand to the extent that it would be most likely to be expanded when in actual use. At that time the inner tubing annular rings 22 are welded to the interior of the outer tubing 25 to produce a complete end seal for the tubing section. The threads are then cut into the outer surface of the outer tubing to produce the complete section.

In accordance with the present invention, the insulating quality of the insulated concentric tubing string is improved by filling the void space in the annulus around the substantially solid insulating material to provide an improved insulation and to establish a firm bonding of the solid insulating material and the inner and outer tubings.

FIGS. 3 and 4 illustrate methods for placing and curing the insulating and bonding material to produce the desired concentric tubing section. FIG. 3 illustrates a portion of a concentric tubing section showing the end portions only with the inner conductor 21 and outer conductor 25 joined by the annular rings 22. A port 41 has been cut into the outer conductor 25 in a position that can be held at its upper end and a conduit 42 is connected to the port 41 to supply liquid bonding material 30 from a supply tank 43. A second port 44 is cut into the same side of the outer tubing 25, preferably in alignment therewith, and a overflow conduit 45 is connected to that port and into an overflow tank 46 having a liquid drain 47 into the supply tank 43. A pump 48 is provided in the supply conduit 42 to circulate the liquid bonding material in through port 41 and out through port 44 to insure complete filling of the space within annulus between the inner and outer tubings which had not been previously filled by the solid insulated material 28.

It should be understood that FIG. 3 illustrates only a partial section of the concentric tubing section and that the annulus 27 between the inner conductor 21 and the outer conductor 25 is truly a hollow cylindrical annulus completely surrounding the inner tubing and that the solid insulating material 28 substantially fills the annulus except for the space needed to permit fabrication of the tubing section and the space created as the inner tubing is expanded before being joined to the outer tubing to form the completed concentric tubing section.

In accordance with the present invention the liquid bonding material 30 that has been placed in the annulus is dehydrated and foamed to produce a bonding and insulating material as shown in FIG. 2. To accomplish that function, FIG. 4 illustrates a heating and control system which may be useful in curing the bonding and insulating material to produce the desired end product of a concentric tubing section.

The present inventor has found that it is essential in creating an effective bond and an effective insulation from the liquid bonding material that the temperature of the curing process be carefully controlled so as not to cause overactive foaming of the bonding material. In accomplishing that careful control it has been discovered that if the tubing section is raised in temperature to about the temperature of foaming for the bonding material, thus causing the material to dehydrate, that the bonding material will be gradually foamed and dehydrated so as to produce a superior bond between the tubing members and the solid insulating material.

A means and a method for accomplishing that purpose is illustrated in FIG. 4 where a portion only of the tubing section is shown with only one of the vent ports along with means for heating the tubing section. As illustrated, the tubing section is heated by an exterior flame source 51, here shown as a ring surrounding the assembled section, and by an internal flame source 52 inserted within the interior of the inner tubing member.

A fuel source and control 53 is connected by suitable piping 54 and valves 55 and 56 connected respectively to the flame sources 51 and 52. A motor-driven fan 57 is illustrated in a position to force air through the interior of the inner tubing. A port, which may be port 41 or 44, as shown in FIG. 3, is shown at the upper surface of the tubing section as a vent for the vapor phase of the bonding material which is evaporated during the dehydration caused by the heating.

The fabrication of the insulated concentric tubing section of FIG. 2 by the processes shown in FIGS. 3 and 4 is accomplished by circulating the bonding material through the annulus between the inner tubing and the outer tubing in the void space not otherwise filled by the substantially solid insulating material 28. Pump 48 has circulated the fluid to insure that the bonding material has completely filled the cavity in the annulus, the circulation is terminated and, after a reasonable delay, the section is subjected to a heating process for the purpose of dehydrating the bonding material to form the desired insulation and bonding within the annulus. As shown in FIG. 4, the fuel source and control 53 suppy fuel to the heating sources 51 and 52 under the control of valves 55 and 56 to establish the desired heating of the tubing section to cause the desired dehydration and foaming of the bonding material. In the preferred method, the section is heated initially in the interior until the entire section has been brought up to a desired temperature. That desired temperature is a temperature which will cause dehydration and slight foaming of the bonding material without causing violent foaming and bonding material displacement. The desired temperature is established by monitoring the material coming out of the vent 41 or 44 to maintain the interior temperature at that temperature which will produce vapors only and minimal foaming discharge from the vent. After the section has been brought to temperature, the interior heat through source 52 may be terminated while the exterior heat is retained and then air is blown through the inner tubing without heat. It has been found that this procedure will produce the best form of bonding conversion and will establish a good bond and a good insulation connection between the tubings and the insulating material. When all of the bonding material has been dehydrated, which can be determined by monitoring the vapor phase coming off from the vents, the heat is terminated and the tubing section is permitted to cool. Once cooled and once the bonding material, then in foamed form, has completely solidified, vents are welded shut and machined flush. The tubing section is then completed and it is in condition for use with other sections to produce a tubing string for the purpose shown in FIG. 1.

In the fabrication of tubing sections of the form herein illustrated, it has been found that the preferred material for the substantially solid insulating material is a foamed calcium silicate. The bonding material of preference is a sodium silicate in a liquid form. It has been found that with a conventional 30-foot length of tubing section, about 3 gallons of sodium silicate is needed to completely fill the voids within the annulus. It has further been found that allowing the filled tubing section to sit for approximately 36 hours has produced the best penetration of the sodium silicate into the pores at the surface of the calcium silicate insulating material. After heating and dehydration in the form herein described at a temperature of about 225° F., a desired end product of a concentric tubing section has been produced. The sodium silicate used in those conditions was a 40% solution of Bentonite silica with 60% water (volume percent) to produce the desired bonding material. Heating at 225° F. for 3 hours accomplished the desired dehydration, foaming and bonding within the annulus.

While a certain preferred embodiment of the invention have been specifically disclosed, it should be understood that the invention is not limited thereto as many variations will be readily apparent to those skilled in the art and the invention is to be given its broadest possible interpretation within the terms of the following claims.

I claim:

1. An insulated concentric conductor tubing having a substantially solid insulation in the annular space between said concentric conductors comprising:
   (a) a first conductor having an annular surface;
   (b) a second conductor within said first conductor and having an annular surface establishing an annular space between said annular surface of said first and said annular surface of said second conductors;
   (c) a preformed substantially solid, calciuim silicate insulating material within said annular space; and
   (d) a foamed sodium silicate bonding material within said annular space substantially completely filling said annular space not filled by said preformed substantially solid insulating material, sealing said annular space and bonding said insulating material to said annular surfaces of said first and said second conductor.

* * * * *